UNITED STATES PATENT OFFICE.

PAUL ASKENASY AND LORENZ STOCKEM, OF NUREMBERG, GERMANY, ASSIGNORS TO ELEKTROCHEMISCHE WERKE, GESELLSCHAFT M. B. H OF BERLIN, GERMANY, A CORPORATION OF GERMANY.

METHOD OF PRODUCING CALCIUM HYDRID.

No. 857,146.      Specification of Letters Patent.      Patented June 18, 1907.

Application filed May 17, 1906. Serial No. 317,402.

*To all whom it may concern:*

Be it known that we, PAUL ASKENASY and LORENZ STOCKEM, subjects of the Emperor of Germany, residing at Nuremberg, Germany, have invented a new and useful Method of Producing Calcium Hydrid, of which the following is a specification.

Calcium forms, as is well known, with hydrogen a compound of the formula $CaH_2$. On the ground of a notice published by Lengyel (*Chem. Centralblatt* 1898/II p. 262) it was believed that calcium combines with hydrogen at the ordinary temperature. Moissan (C. R. 127.30) showed the error of this opinion. He was able to dry calcium powder in the stream of hydrogen at an ordinary temperature (C. R. 126, 1753, 1758) Moissan (C. R. 127, 29) as well as A. Guntz and H. Bassey (C. R. 140, 863–864) said that hydrid of calcium could best be produced by heating finely divided calcium in an atmosphere of hydrogen. The latter even call attention to that the technical calcium is unsuited for the production of hydrid of calcium, as it is too compact. We have convinced ourselves of the correctness of these statements and also found that with a bright cherry-red, below the melting-point of the calcium, which is at about 800° C., pieces of calcium-metal passed over only on the surface into hydrid, whereas the metal in the interior remained unaffected. For producing large quantities of hydrid, which is exceedingly well suited for aerial navigation, these methods are, therefore, not applicable, as they are exceedingly troublesome and costly, which can also be seen from a remark by H. Moissan (C. R. 127, 29 and 30) who explicitly prescribes that of pure crystallized calcium only 5–6 gr. should be converted at a time into hydrid, in a metal boat; if more hydrid is to be produced, several boats should be provided, and arranged in a row.

The inventors have now found that hydrid can easily be obtained in large quantities, coming nearly up to the theoretical result, if calcium is melted preferably in iron vessels and hydrogen is conducted into the molten metal. It is then very eagerly absorbed, so that even a vacuum is produced on cutting off the hydrogen. The whole mass which originally consists of a mixture of metal and hydrid is kept in a liquid state during the reaction. The latter then takes place in the same rapid manner until all the metal has been changed into hydrid. Thus, for instance, the inventors succeeded in this way to convert 1 kilo of calcium-metal within 5 minutes into hydrid. The hydrid taken out in this way in form of solid lumps from the steel crucible, which served as a reaction-vessel, contained 84% $CaH_2$. The compound is, as is well known, exothermic, so that, after the reaction has begun, only a small supply of external heat is required. Small quantities of air or dampness in the hydrogen are not detrimental.

What we claim as our invention and desire to secure by United States Letters Patent is—

The hereinbefore described method of producing hydrid of calcium by a direct combination of hydrogen with calcium, consisting in conducting hydrogen into molten calcium, substantially as and for the purpose set forth.

In testimony whereof we have signed our names to this specification in the presence of two subscribing witnesses.

PAUL ASKENASY.
LORENZ STOCKEM.

Witnesses:
MAX HAMBURGER,
JULIUS RUMLAND.